United States Patent
Sekhar et al.

(10) Patent No.: US 6,698,219 B2
(45) Date of Patent: Mar. 2, 2004

(54) ENERGY-EFFICIENT VARIABLE-AIR-VOLUME (VAV) SYSTEM WITH ZONAL VENTILATION CONTROL

(75) Inventors: Chandra Sekhar, Singapore (SG); Kwok Wai Tham, Singapore (SG); David Kok Wai Cheong, Singapore (SG); Nyuk Hien Wong, Singapore (SG)

(73) Assignee: National University of Singapore, Singapore (SG)

( * ) Notice: Subject to any disclaimer, the term of this patent is extended or adjusted under 35 U.S.C. 154(b) by 0 days.

(21) Appl. No.: 10/306,735

(22) Filed: Nov. 29, 2002

(65) Prior Publication Data
US 2003/0146289 A1 Aug. 7, 2003

Related U.S. Application Data
(60) Provisional application No. 60/334,104, filed on Nov. 30, 2001.

(51) Int. Cl.[7] .............................. F25D 17/00; F24F 1/00
(52) U.S. Cl. .................. 62/179; 165/212; 236/49.3; 454/236
(58) Field of Search .................. 236/49.3, 13; 165/214, 165/212; 454/236, 261; 62/179

(56) References Cited

U.S. PATENT DOCUMENTS

| 3,934,795 A | | 1/1976 | Ginn et al. .................... 236/13 |
| 4,437,608 A | * | 3/1984 | Smith .......................... 236/13 |
| 5,346,127 A | * | 9/1994 | Creighton .................... 236/13 |
| 5,673,851 A | | 10/1997 | Dozier et al. ............... 236/49.5 |

* cited by examiner

Primary Examiner—William Wayner

(57) ABSTRACT

A ventilation and air-conditioning system uses a first variable-air-volume system to cool and dehumidify fresh outside air and deliver it through a first duct to a mixing box located downstream. The system also uses a second variable-air-volume system to further cool and dehumidify recycled air and deliver it through a second duct to the mixing box where the fresh and recycled air are able to mix prior to ventilation into a room or office. The system uses a carbon dioxide sensor and a temperature sensor to provide feedback signals to a control system, which in turn regulates fan speeds and damper openings in order to provide optimal cooling and ventilation and to conserve energy when cooling and ventilation requirements are low.

16 Claims, 3 Drawing Sheets

ENERGY-EFFICIENT VARIABLE-AIR-VOLUME (VAV) SYSTEM WITH ZONAL VENTILATION CONTROL

CROSS-REFERENCE TO RELATED APPLICATION

The following application claims the benefit of U.S. Provisional Patent Application, Serial No. 60/334,104 which was filed, Nov. 30, 2001, entitled, ENERGY EFFICIENT VARIABLE AIR VOLUME (VAV) SYSTEM WITH ZONAL VENTILATION CONTROL and which has the same inventors.

FIELD OF THE INVENTION

This invention relates to heating, ventilation and air conditioning (HVAC), and, more specifically, to an energy-efficient system for optimizing indoor air quality.

BACKGROUND OF THE INVENTION

The build-up of indoor air pollutants and the ability of the ventilation system to eliminate these indoor air pollutants affect the quality of air in the indoor environment. Although health and thermal comfort can usually be addressed by attempting to eliminate the various sources of indoor pollutants, it is almost impossible to totally eliminate them. It is thus inevitable that ventilation with fresh air should play an important role in the eventual quality of the air in the indoor environment. In the design of ventilation systems, it is not sufficient to ensure an adequate provision of total fresh air quantity at the fresh air in take of an air-handling unit (AHU) but it is equally important to consider the related ventilation characteristics. It is essential that the fresh air reaches the localized "breathing zone" of the various occupied zones served by the particular AHU in the correct proportion and maintains the desirable local air exchange effectiveness characteristics at all times. As the occupancy profile in various localized zones of an indoor environment can change quite significantly during the course of operation of an AHU on a daily basis, it becomes necessary to incorporate the response of ventilation systems to such dynamically changing profiles to ensure adequate ventilation provision at all times without excessive energy consumption. This is particularly true in the context of tropical climates.

Conventional design so fair-conditioning and mechanical ventilation systems resort to mixing of the centralized fresh air intake and the return air before being treated by the cooling coil and subsequently distributed to the various occupied zones as "mixed air". The disadvantage of such designs, particularly with variable-air-volume (VAV) systems, is fairly well established, resulting in complaints of in adequate ventilation leading to perceptions of staleness and stuffiness. Such complaints are inevitable due to the inability of these typical designs of VAV systems to maintain adequate fresh air distribution to the dynamically changing occupancy and "other" space load profiles since any reduction of total supply air flow results in a reduction of fresh air quantity.

DESCRIPTION OF THE PRIOR ART

U.S. Pat. No. 5,673,851 (Dozier et al.) discloses a variable-air-volume diffuser with an induction air assembly. As described in the Dozier patent, the air in a room is conditioned and ventilated with two separate duct systems, a first carrying conditioned air from a heater or air conditioner and a second carrying fresh air ("ventilation air"). The conditioned air enters the room through a diffuser. The ventilation air is discharged through an air induction nozzle and blows past a temperature sensor that, in turn, controls the flow of conditioned air. The flow rate of conditioned air is regulated by virtue of a movable flow control element located in the diffuser.

U.S. Pat. No. 3,934,795 (Ginn et al.) discloses a dual duct variable volume air conditioning system. As described in the Ginn patent, the air in a room is conditioned using two independent ducts, a first supplying cold air and a second ("reset duct") supplying either hot or cold air. Flow through each duct is regulated by valves which are opened and closed by a self-contained system regulator in response to changes in room temperature. Each duct also has a pressure-responsive sensor-actuator for sensing flow velocity in the duct and adjusting the valve positions through a direct mechanical linkage.

However, certain drawbacks are evident from the prior art designs. The prior art HVAC systems have failed to provide a system for supplying both primary outside air (required for ventilation) and secondary return air (required for offsetting thermal loads) in such a way that indoor air quality at various locations inside a building and overall energy efficiency are optimized. Current state-of-the-art variable-air-volume HVAC systems, which are popular in the tropics, have significant cooling and dehumidifying requirements. These systems typically employ floor-by-floor Air Handling Units (AHUs). A single VAV fan is designed to distribute air throughout the various zones of a building. The prior art designs usually suffer from inadequate fresh air ventilation in the localized zones since the fresh air damper is also throttled when the volumetric flow rate is reduced in a VAV system at lower thermal loading conditions.

Thus, there is a need in the art for an improved HVAC system that overcomes the foregoing deficiencies.

SUMMARY OF THE INVENTION

It is an object of the present invention to provide an energy-efficient HVAC system having zonal ventilation control for controlling the indoor air quality (IAQ) at various locations of a building.

As embodied and broadly described here in, the present invention provides a ventilation and air conditioning system for providing zonal cooling and ventilation, said system comprising an air-handling unit for distributing air throughout a building or structure, said air-handling unit having a first intake for channeling fresh air to a heat-exchanging device capable of producing conditioned fresh air; a first fan for moving said conditioned fresh air through a fresh air duct; a second intake for channeling recycled air to a heat-exchanging device capable of producing conditioned recycled air; and a second fan for moving said conditioned recycled air through a recycled air duct; said system also comprising a mixing chamber connected to a distal end of said fresh air duct and also connected to a distal end of said recycled air duct, said mixing chamber being an enclosure for mixing the conditioned fresh air and the conditioned recycled air for subsequent ventilation into a nearby space.

The system described herein provides efficient air distribution, especially in high-rise air-conditioned buildings, while at the same time ensuring excellent ventilation. The significant advantage of the invention over current state-of-the-art systems is that the provision of fresh air at each of the localized zones is a function only of the occupant density (as sensed by its own localised $CO_2$ sensor) and is not affected by any variation in thermal loads. This will then ensure that adequate ventilation and acceptable indoor air quality is maintained in all the individual zones at all times. Thus, the HVAC system of the present invention provides optimal amounts of fresh and conditioned air to different rooms or offices in the same building. By mixing the supplies of fresh and conditioned air on location, i.e., at the point of final distribution, different rooms in the same building can receive tailored air supply depending on the local thermal load and occupancy profile.

Preferably, the HVAC system comprises a single-coil twin-fan air-handling unit.

A single-coil twin-fan AHU enables the simultaneous conditioning of two separate air streams without mixing in the downstream section of the coil. The single-coil twin-fan design facilitates the treatment of fresh and return air streams separately (using separate fans which are independently and separately controlled) so as to achieve optimal dehumidifying performance on the fresh air stream (which is predominantly latent cooling) and optimal cooling performance on the return air stream (which is predominantly sensible cooling). Another key advantage of the overall system concept is the ability to achieve the desired cooling and dehumidifying performance in a rather independent manner using a single coil. A single coil can be installed in one air-handling unit with suitable modifications to the airways. Usually, a simple sheet-metal barrier will suffice to separate the fresh and the return air streams. By using a single coil with a single chilled water feed, the intermediate return and supply manifolds between the fresh air coil and return air coil are no longer required, resulting in fewer components and less cost. This would also mean that the AHU would occupy less space in the building.

Other objects and features of the invention will become apparent by reference to the following description and the drawings.

BRIEF DESCRIPTION OF THE DRAWINGS

The invention is further described, by way of example only, with reference to the accompanying drawings wherein.

Figure 1:
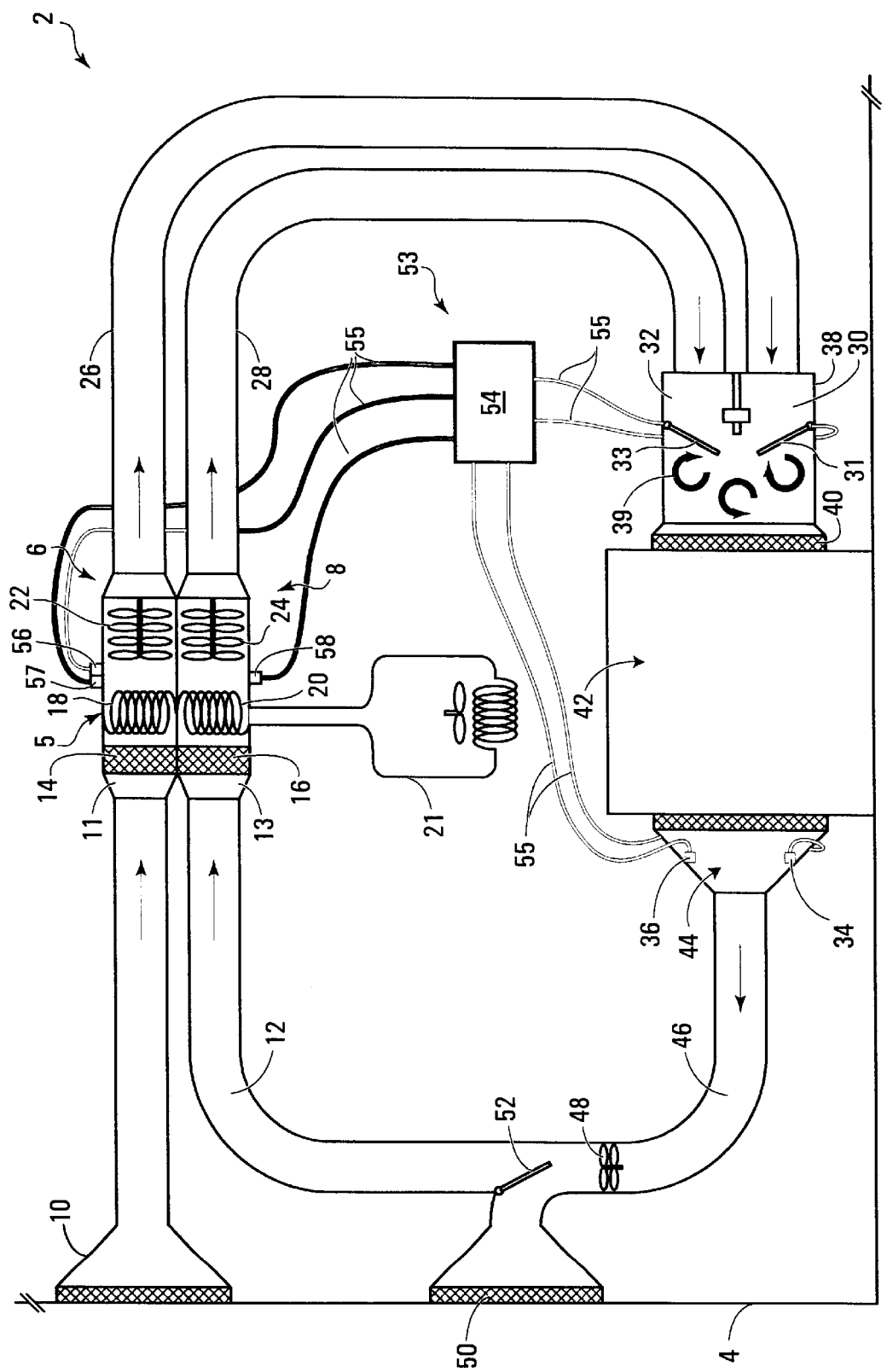
FIG. 1 is a schematic of an energy-efficient VAV system with zonal ventilation control that is the subject of the present invention.

In the drawings, preferred embodiments of the invention are illustrated by way of examples. It is to be expressly understood that the description and drawings are only for the purpose of illustration and are an aid for understanding. They are not intended to be a definition of the limits of the invention.

DESCRIPTION OF THE PREFERRED EMBODIMENTS

Referring to FIG. 1, an HVAC system denoted generally by the reference numeral 2 for ventilating and conditioning the air in a building 4 has an air-handling unit (AHU) 5 which comprises two separate variable-air-volume (VAV) systems 6,8. The first VAV system 6 draws in fresh air from outside through a fresh air intake 10. The fresh air intake 10 has a diffuser 11 which expands and slows the fresh air for maximal heat transfer. The fresh air is first filtered through a fresh air filter 14 and then cooled and dehumidified by a fresh air coil 18. The fresh air coil 18 is a heat-exchanging coil with a single feed of chilled water. A fresh air fan 22 moves the conditioned fresh air downstream through a fresh air duct 26 to a fresh air VAV box 30. The fresh air VAV box 30 is connected to a mixing box 38 into which the fresh air may flow. A fresh air damper 31 regulates the flow of conditioned fresh air into a mixing chamber 39 which is a portion of the mixing box 38.

The second VAV system 8 draws recycled air from inside the building through a recycled air in take 12. The recycled air intake 12 has a diffuser 13 to expand and slow the recycled air for maximal heat transfer. The recycled air is first filtered through a recycled air filter 16 and then cooled and dehumidified by a recycled air coil 20, which functions as a heat exchanger. The recycled air coil is a heat-exchanging coil with a single feed of chilled water. A recycled air fan 24 moves the conditioned recycled air downstream through a recycled air duct 28 to a recycled air VAV box 32. The recycled air VAV box 32 is connected to the mixing box 38 into which the recycled air may flow. A recycled air damper 33 regulates the flow of conditioned recycled air into the mixing chamber 39 of the mixing box 38.

A feedback control system, which is managed by a central processing unit (CPU) 54, controls the operation of the HVAC system 2. The CPU 54 computes optimal fan speeds and damper openings based on temperature and carbon dioxide ($CO_2$) readings from sensors located at various places in the building 4.

Referring still to FIG. 1, the return air duct 46 of the said zone contains the carbon dioxide and temperature sensors 34 and 36 near the return air grille 44. The carbon dioxide sensor 34 and the temperature sensor 36 are linked via wires 55 (or cables) to the central processing unit (CPU) 54 of the control system. The sensors 34 and 36 would provide signals to determine optimal damper opening and fan speeds. In this regard, the carbon dioxide sensor controls the fresh air damper in the fresh air VAV box 30 and the temperature sensor 36 controls the recycled air damper in the recycled air VAV box 32. The CPU 54 computes the optimal damper openings for the fresh air damper 31 and the recycled air damper 33 so that the optimal mixture of fresh and recycled air flows into a mixing chamber 39 in the mixing box 38. The CPU 54 also regulates the fan velocity of each VAV system to vary the overall cooling and ventilation in accordance with total building demand. The CPU 54 controls the fan speed on the first VAV system 6 and on the second VAV system 8. The CPU 54 also receives feedback signals from a fresh air temperature sensor 56, a humidity sensor 57 and a recycled air temperature sensor 58.

Accordingly, conditioned fresh air and conditioned recycled air are mixed in the mixing box 38 in accordance with the local cooling and ventilation requirements. The mixing box 38 preferably functions as a plenum chamber. A plenum chamber is an enclosed space in which the air pressure is greater than that in the outside atmosphere. Air is thus forced into the mixing box 38 (plenum chamber) for slow distribution through a localized diffuser vent 40.

As noted above, the mixed air is vented through a diffuser vent 40 into a room 42 (or office or building zone). The room 42 also has a return vent 44, which draws room air into a return air duct 46. A return fan 48 is provided to assist the return flow of the recycled air back to the second VAV system 8. The return air duct 46 bifurcates into an exhaust vent 50 and the recycled air intake 12. A controllable damper 52 is located at the bifurcation of the return air duct 46. The damper 52 can be controlled to divert a variable amount of recycled air back to the second VAV system 8, i.e., into the recycled air intake 12. The CPU 54 controls the damper 52 to alleviate air pressure build-up when large volumes of fresh air are ventilated into the system.

Figure 2:
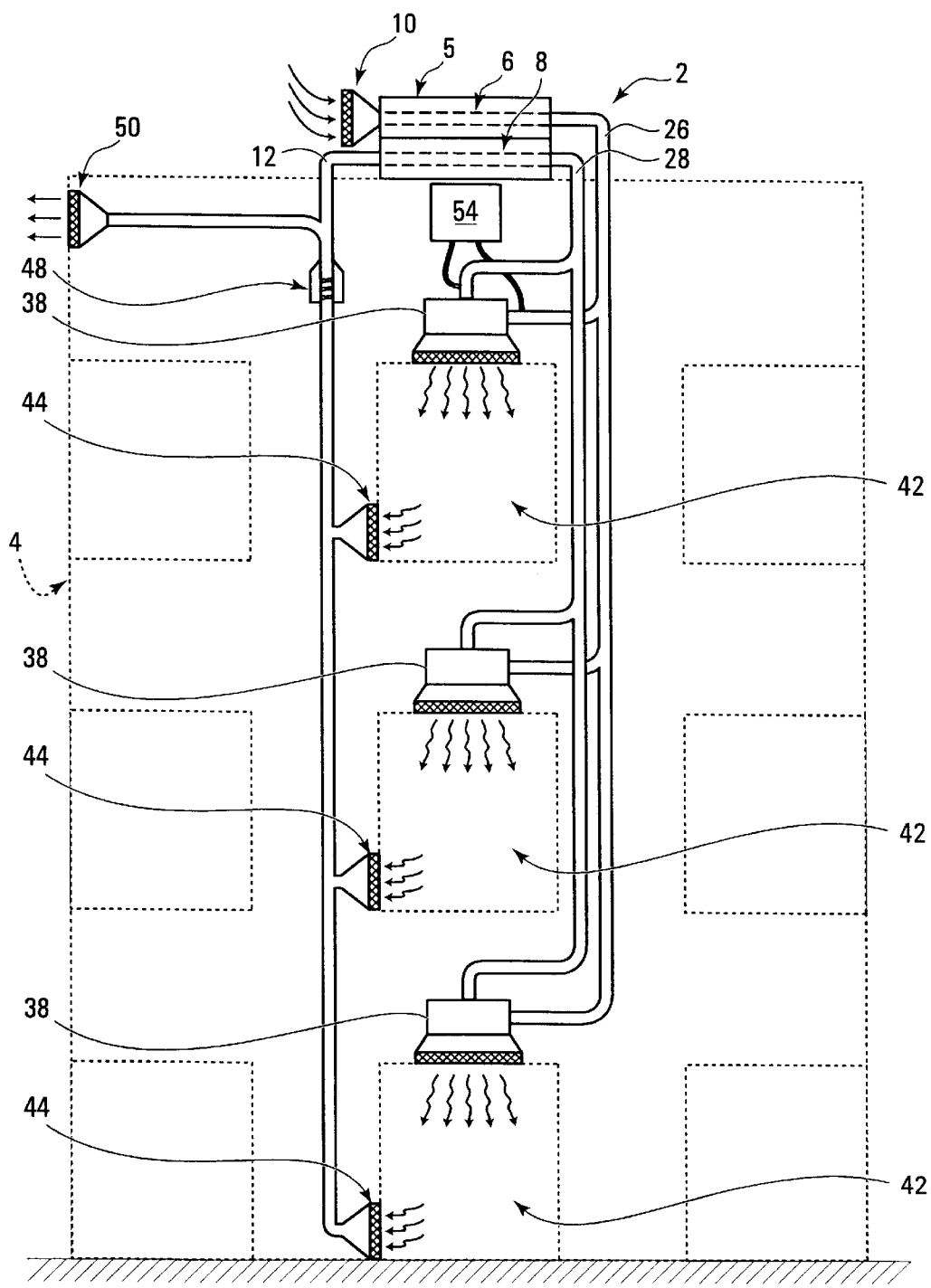
FIG. 2 is a schematic of an energy-efficient VAV system with zonal ventilation control distributing conditioned air to three separate locations.

By virtue of this remote, "localized" mixing in the mixing box 38, cooling and ventilation can be optimized and tailored according to the local thermal loads and the local occupancy profile. By mixing the two streams of air in the mixing box 38 in, or adjacent to, the zone to be cooled and ventilated, the system can achieve zonal ventilation control without sacrificing energy efficiency. With the locally mixed air, the system can ensure that there is adequate cooling to deal with localized thermal loads as well as proper ventilation in areas where the air would otherwise be considered uncomfortably stale or stuffy. This system not only ensures excellent Indoor Air Quality (IAQ) but it is capable of doing so with a single air-handling unit 5, although more than one AHU would be used for larger buildings. As illustrated in FIG. 2, the HVAC system 2 is capable of distributing two separate air streams (one of conditioned fresh air and another of conditioned recycled air) to various mixing boxes 38 located in different places in the building 4. Thus, the HVAC system 2 is capable of cooling and dehumidifying different rooms 42 (or offices or zones of a building) in accordance with localized requirements. Although FIG. 2 shows a single AHU 5 for ventilating and conditioning the air in the building 4, it should be understood that more than one AHU 5 may be required depending on the size, location and occupancy profile of the building 4.

It is to be noted that the description of the preferred embodiment so far refers to the use of twin VAV systems, which leads to significant energy saving potential. As an option, it would also be possible to employ twin Constant Air Volume (CAV) systems or even a hybrid system consisting of a VAV and a CAV system. In the latter option, the air stream whose load characteristics are constant could be a CAV system while the air stream with significantly varying load characteristics could be a VAV system. The CPU 54 controls the cooling and ventilation functions by regulating the opening and closing of the dampers 31, 33, and the return damper 52.

The preferred embodiment described herein and shown in FIG. 2 conditions and distributes two air streams throughout the multiple zones of an air-conditioned building such that adequate ventilation, and consequently, acceptable indoor air quality (IAQ) is ensured throughout the operating range of the VAV systems 6,8. The overall system performance is significantly enhanced in conjunction with a single-coil twin-fan variable-air-volume system ("SCTF-VAV"). Employing an SCTF-VAV permits optimal cooling and dehumidifying performance of fresh and return air streams using only a single coil with a single feed of chilled water flow but with two completely isolated air streams. Thus, the fresh air coil 18 and the recycled air coil 20 would be merged into a single heat-exchanging coil. But, by virtue of two separate ducts, the fresh air and the recycled air are maintained as independent and separate air streams upstream, through and downstream of the coil.

Figure 3:
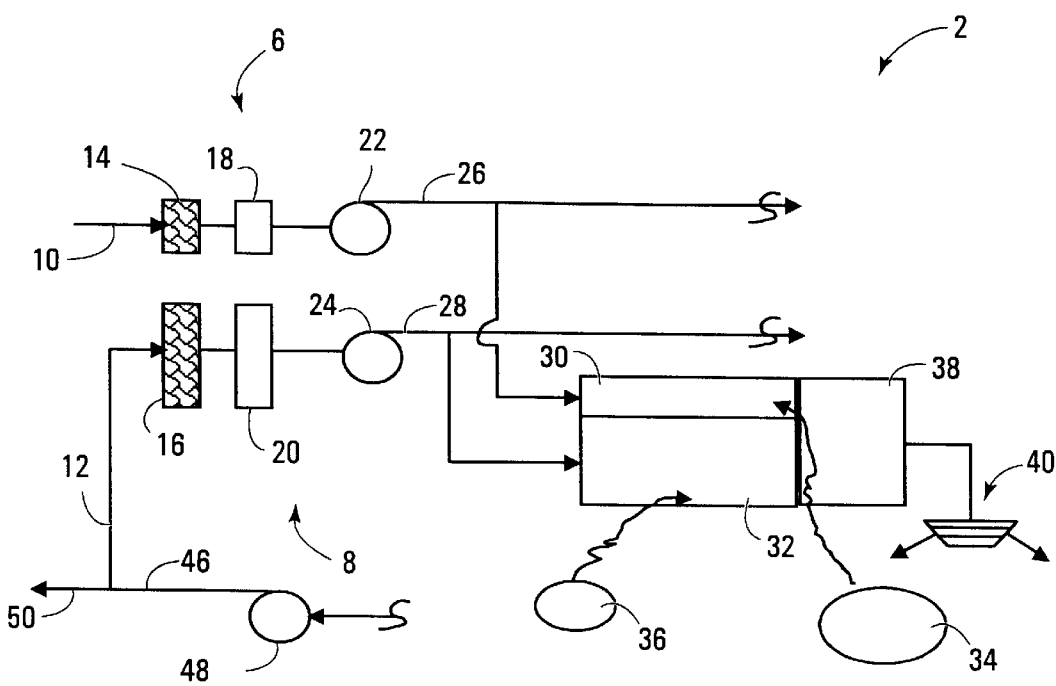
FIG. 3 is simplified schematic of the system depicted in FIG. 1.

As illustrated by the simplified schematic in FIG. 3, the HVAC system 2 may employ two VAV systems 6,8 (either with two coils or a single coil) for cooling and dehumidifying two separate streams of air. The fresh air is conditioned by its own air-conditioning system (the first VAV system) and distributed to the various fresh air VAV boxes 30 that form part of an air distribution network. Each of these fresh air VAV boxes 30 is controlled by the CPU 54 which receives an input signal from a localized carbon dioxide ($CO_2$) sensor 34 to ensure adequate ventilation. A certain minimum provision of fresh air is considered healthy in order to avoid an accumulation of $CO_2$ due to human respiration as well as emissions from building materials and equipment. As the main purpose of the fresh air VAV box 30 is to ensure adequate fresh air based on occupant density, when the building is vacant, or nearly empty, the CPU 54 will receive a signal from the $CO_2$ sensor 34 to slow down the fresh air VAV system 6, there by conserving energy. The return air from the various zones of the same distribution network is conditioned by a separate air-conditioning system (the second VAV system) and distributed to a separate set of recycled air VAV boxes 32. The CPU 54 controls each recycled air VAV box 32. Based on input signals from the localized temperature sensors 36, the CPU will vary the flow in the second VAV system 8. When thermal loading is low, the CPU will slow the output from the second VAV system 8. Consequently, significant energy savings are possible at partial-load operating conditions resulting from low occupancy or moderate weather. As depicted in FIG. 2, the conditioned fresh air and the conditioned recycled air travel in parallel ducts 26, 28 and do not mix until just before the diffuser vent 40 in the mixing box 38.

Figure 4:
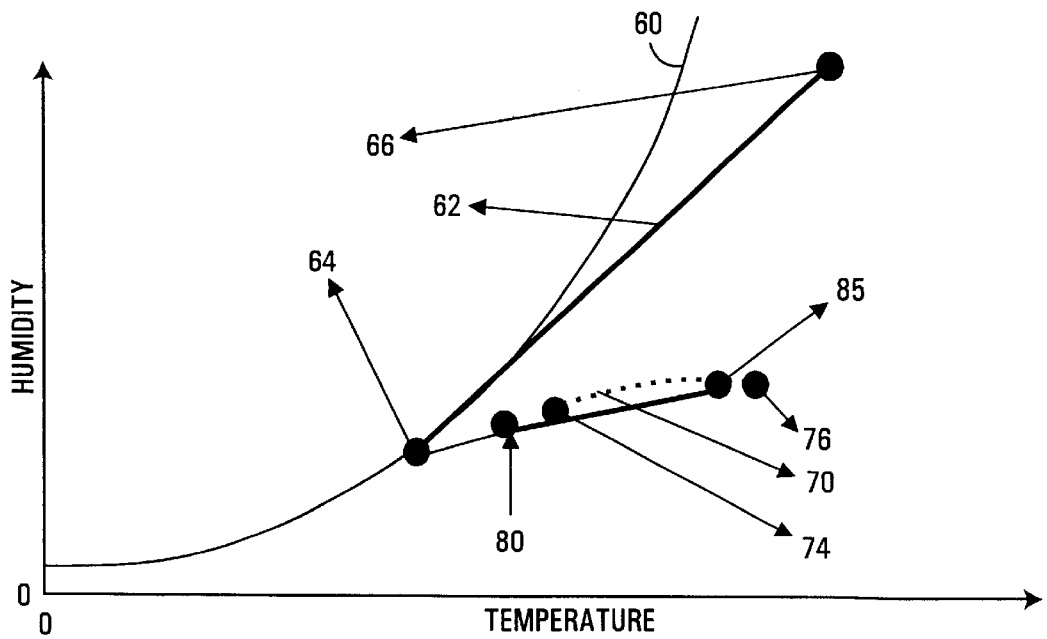
FIG. 4 is a psychrometric chart illustrating graphically the dehumidifying performance of the system depicted in FIG. 1.

FIG. 4 depicts graphically the psychrometric performance of the HVAC system of the present invention. (A psychometric chart shows the variation of humidity, or vapor pressure, as a function of air temperature). Significantly improved dehumidification can be achieved when the humid outside air is treated separately. This leaves the recycled air coil to handle the predominantly sensible cooling loads. Besides the realization of substantial energy saving due to this method of conditioning air, the use of VAV systems for both air streams results in fan energy savings as well. FIG. 4 shows a condition curve for outside air 60 representing the psychrometric curve for outside (fresh) air at a given temperature and relative humidity. A coil condition curve for the first VAV system 62 (fresh air) is plotted on the graph in FIG. 4. The fresh air condition curve is defined at one end by on-coil conditions 66 and off-coil conditions 64. A coil condition curve for the second VAV system 70 (recycled air) is also plotted on the graph in FIG. 4. The recycled air condition curve is defined by on-coil and off-coil conditions 76, 74. Mixing box conditions 80 as well as room conditions (or"space conditions") 85 are also plotted on the psychrometric chart in FIG. 4. The superior dehumidifying performance of the HVAC system of the present invention is apparent from FIG. 4. The room is substantially dehumidified in comparison with outdoor humidity levels for a given temperature.

The superior performance of the HVAC system of the present invention was validated by various experiments that were conducted in the Indoor Air Quality (IAQ) Chamber of the Department of Building at the National University of Singapore. The seven experiments presented in Table 1 below represent different points of operation of a variable-air-volume fan in a steady-state condition.

TABLE 1

Simulated experimental conditions in two chambers (Room 1 and Room 2) and simulated fan operating characteristics

| Experiment | Steady state period | Fresh air (F/A) fan | Recycled air (R/A) fan | Thermal load Room 1 | Thermal load Room 2 | Ventilation load Room 1 | Ventilation load Room 2 |
|---|---|---|---|---|---|---|---|
| 1 | 11:40 am–12:15 p.m. | 30% | 30% | Base | Base | Base | Base |
| 2a | 12:15–12:35 p.m. | 30% | 30% | Base | Base | High | Base |
| 2b | 1:00–1:20 p.m. | 100% | 30% | Base | Base | High | Base |
| 3a | 2:00–2:15 p.m. | 30% | 30% | High | Base | Base | Base |
| 3b | 2:20–2:45 p.m. | 30% | 100% | High | Base | Base | Base |
| 4a | 3:15–3:40 p.m. | 30% | 30% | Base | Base | High | Base |
| 4b | 3:40–4:10 p.m. | 100% | 30% | Base | Base | High | Base |

Tabulated above in Table 1 are various experiments that were run with thermal and ventilation loads that are characterized as either base or high. Base loads correspond to vacant or nearly vacant conditions, for which only minimal cooling and ventilation are required. Typically, base loads require fans to be run at 30% of their maximum speed. High ventilation loads are simulated by having eight occupants in Room 1 and high thermal loads are simulated by additional heat-emitting lights in Room 1. A fresh air VAV box and are cycled air VAV box were installed in both Rooms 1 and 2. For each room, the fresh and recycled air streams mix down stream in a plenum box (mixing box) before being ventilated into the room via supply air diffusers. Carbon dioxide ($CO_2$) sensors control the fresh air VAV damper. Return air temperature sensors control the recycled air VAV damper. A set of $CO_2$ and temperature sensors is provided for each of the two rooms and they are located in the return air duct near the return air grilles.

The seven experiments represent various steady-state conditions. The superior performance of the HVAC system of the present invention is reflected in the action of the VAV box dampers under various combinations of ventilation and thermal requirements. Room 2 is used as a control room with base thermal and ventilation loads throughout the seven experiments. Room 1 is the experimental room, in which the thermal and ventilation loads are varied. Experiment 1 begins with base thermal and ventilation loads, followed (in Experiments 2 and 3) with a high ventilation load and then a high thermal load. The final experiments (4a and 4b) involve high ventilation loads in Room 1 (similar to experiments 2a and 2b) except that the chilled water modulation is now achieved by using the fresh air "off-coil" set-point temperature. (In all previous experiments, the recycled air "off-coil" set-point temperature was used.) The space carbon dioxide levels and the associated damper positions are presented in Table 2 below.

TABLE 2

| Parameters under consideration | 1 Control | 1 Exp | 2a Control | 2a Exp | 2b Control | 2b Exp | 3a Control | 3a Exp |
|---|---|---|---|---|---|---|---|---|
| Loading Type | | | | | | | | |
| Ventilation load | Base | Base | Base | High | Base | High | Base | Base |
| Thermal Load | Base | Base | Base | Base | Base | Base | Base | High |
| Fan Speed | | | | | | | | |
| Fresh air | 30% | 30% | 30% | 30% | 100% | 100% | 30% | 30% |
| Return air | 30% | 30% | 30% | 30% | 30% | 30% | 30% | 30% |
| Carbon dioxide level | | | | | | | | |
| Set point level | 550 ppm | 550 ppm | 550 ppm | 550 ppm | 550 ppm | 550 ppm | 550 ppm | 550 ppm |
| Actual meas level | 509 ppm | 448 ppm | 558 ppm | 975 ppm | 555 ppm | 756 ppm | 480 ppm | 475 ppm |
| Damper position | | | | | | | | |
| Fresh air Damper | 99.80% | 26.40% | 99.80% | 99.80% | 99.80% | 99.80% | 63.10% | 0% |
| Return air Damper | 99.60% | 99.60% | 98.40% | 99.80% | 99.60% | 99.80% | 99.60% | 99.80% |

| Parameters under consideration | 3b Control | 3b Exp | 4a Control | 4a Exp | 4b Control | 4b Exp |
|---|---|---|---|---|---|---|
| Loading Type | | | | | | |
| Ventilation load | Base | Base | Base | High | Base | High |
| Thermal Load | Base | High | Base | Base | Base | Base |
| Fan Speed | | | | | | |
| Fresh air | 30% | 30% | 30% | 30% | 100% | 100% |
| Return air | 100% | 100% | 30% | 30% | 30% | 30% |

TABLE 2-continued

| Carbon dioxide level | | | | | | |
|---|---|---|---|---|---|---|
| Set point level | 550 ppm | 550 ppm | 550 ppm | 550 ppm | 550 ppm | 550 ppm |
| Actual meas level | 520 ppm | 480 ppm | 567 ppm | 911 ppm | 494 ppm | 580 ppm |
| Damper position | | | | | | |
| Fresh air Damper | 99.80% | 0% | 99.80% | 99.80% | 99.80% | 99.80% |
| Return air Damper | 99.20% | 99.60% | 99.60% | 99.60% | 99.60% | 99.20% |

Table 2 clearly shows that the fresh air damper opens fully when eight occupants are present in Room 1 (Experiments 2a, 2b, 4a and 4b). The fresh air damper opens when the $CO_2$ level in Room 1 exceeds the set-point of 550 parts per million (ppm). In Experiments 2b and 4b, the fresh air fan is set to operate at 100% of its maximum speed. The opening of the fresh air damper in these two experiments is a clear indication that more fresh air is actually being provided to Room 1 to dilute the elevated $CO_2$ levels. Changing the load characteristics in Room 1 during Experiments 3a and 3b resulted in the fresh air damper virtually closing in Room 1 as the actual $CO_2$ level was less than 550 ppm. Meanwhile, the high thermal load (due to the additional lighting) demanded more recycled air. Consequently, the recycled air damper remained fully open during these experiments. Carbon dioxide levels were monitored continuously at the following locations during the course of the seven experiments: (1) in the occupied zone of Room 1 at a height of 1.2 m; (2) in each of the two return air grilles in Room 1; (3) in the occupied zone of Room 2 at a height of 1.2 m; (4) in the return air grille in Room 2; and (5) in the fresh air stream (ambient air reference).

During Experiment 1, the $CO_2$ levels in all of the indoor locations corresponded to base ventilation load levels, that is, just slightly above the ambient level of 400 ppm. At the beginning of Experiment 2a, eight occupants moved into Room 1 whereupon it was observed that the $CO_2$ level rose to 1000 ppm inside Room 1 as well as inside Room 1's two return air grilles. During this period, the $CO_2$ level in Room 2 stayed almost the same, with minor fluctuations caused by the recirculating air.

Experiment 2a was conducted with both the fresh air and recycled air fans operating at 30% speed. At the beginning of Experiment 2b, the speed of the fresh air fan was increased to 100% while the recycled air fan remained at 30%. The additional fresh air supplied during Experiment 2b resulted in the significant reduction of $CO_2$ levels in Room 1 to about 750 ppm. During this time, the $CO_2$ level in Room 2 remained essentially unchanged. This shows that zonal ventilation control is clearly being achieved.

In Experiments 3a and 3b, base ventilation loads were maintained in both rooms, which is evidenced by the $CO_2$ readings of about 500 ppm. Experiments 4a and 4b were a repeat of Experiments 2a and 2b except that the chilled water modulation in Experiments 4a and 4b was achieved by controlling the fresh air "off-coil" set-point temperature.

The above description of preferred embodiments should not be interpreted in a limiting manner since other variations, modifications and refinements are possible within the spirit and scope of the present invention. The scope of the invention is defined in the appended claims and their equivalents.

What is claimed is:

1. A ventilation and air conditioning system for providing zonal cooling and ventilation, said system comprising:

(a) an air-handling unit for distributing air throughout a building or structure, said air-handling unit having
      (i) a first intake for channeling fresh air to a first heat-exchanging coil capable of producing conditioned fresh air;
      (ii) a first fan for moving a supply of conditioned fresh air through a fresh air duct;
      (iii) a second intake for channeling recycled air to a second heat-exchanging coil capable of producing conditioned recycled air; and
      (iv) a second fan for moving a supply of conditioned recycled air through a recycled air duct;
   (b) a mixing box connected to a distal end of said fresh air duct and also connected to a distal end of said recycled air duct, said mixing chamber being an enclosure for mixing the conditioned fresh air and the conditioned recycled air for subsequent ventilation into a nearby space;
   (c) a control system for controlling the supply of conditioned fresh air and the supply of conditioned recycled air whereby a desired mixture of conditioned fresh air and conditioned recycled air is ventilated into said space.

2. A ventilation and air conditioning system as defined in claim 1 wherein said control system comprises a carbon dioxide sensor for providing a feedback signal to a central processing unit for controlling the supply of conditioned fresh air and a temperature sensor for providing a feedback signal to said central processing unit for controlling the supply of conditioned recycled air.

3. A ventilation and air conditioning system as defined in claim 2 wherein said mixing box comprises a fresh air chamber connected at a downstream end of said fresh air duct and a recycled air chamber connected at a downstream end of said recycled air duct, each of the chambers having a damper for regulating air flow in to a mixing portion of said mixing box.

4. A ventilation and air conditioning system as defined in claim 3 wherein the air-handling unit further comprises a fresh air filter downstream of the first intake and a recycled air filter downstream of the second intake.

5. A ventilation and air conditioning system as defined in claim 4 wherein said carbon dioxide sensor and said temperature sensor are located in a return air duct, the return air duct being connected to the second intake.

6. A ventilation and air conditioning system as defined in claim 5 wherein said mixing box is a plenum chamber.

7. A ventilation and air conditioning system as defined in claim 1 wherein said air-handling unit comprises a first variable-air-volume system for moving the fresh air through the fresh air duct and a second variable-air-volume system for moving the recycled air through the recycled air duct.

8. A ventilation and air conditioning system as defined in claim 1 wherein said air-handling unit comprises a constant-air-volume system for moving the fresh air through the fresh air duct and a variable-air-volume system for moving the recycled air through the recycled air duct.

9. A ventilation and air conditioning system as defined in claim 1 wherein said air-handling unit comprises a first constant-air-volume system for moving the fresh air through the fresh air duct and a second constant-air-volume system for moving the recycled air through the recycled air duct.

10. A ventilation and air-conditioning system for providing zonal cooling and ventilation, said system comprising an air-handling unit having (a) a first variable-air-volume system for conditioning and moving a volume of conditioned fresh air through a first duct to a mixing box;

(b) a second variable-air-volume system for conditioning and moving a volume of conditioned recycled air through a second duct to said mixing box;

(c) said mixing box having a fresh air damper for admitting a supply of conditioned fresh air into a mixing chamber in said mixing box;

(d) said mixing box having a recycled air damper for admitting a supply of conditioned recycled air into said mixing chamber of said mixing box whereby a desired mixture of conditioned fresh and recycled air is ventilated into a space of a building;

(e) a carbon dioxide sensor for providing a feedback signal to control the first variable-air-volume system and the fresh air damper;

(f) a temperature sensor for providing a feedback signal to control the second variable-air-volume system and the recycled air damper.

11. A ventilation and air conditioning system as defined in claim 10 wherein said air-handling unit comprises a first fan for the first duct and a second fan for the second duct and a single heat-exchanging coil for cooling and dehumidifying both the fresh air in the first duct and the recycled air in the second duct.

12. A ventilation and air conditioning system as defined in claim 11 wherein the first variable-air-volume system comprises a fresh air filter and the second variable-air-volume system comprises a recycled air filter.

13. A ventilation and air conditioning system as defined in claim 12 wherein said mixing box is a plenum chamber.

14. A heating, ventilation and air conditioning (HVAC) system for cooling and ventilating a building or other structure, said system comprising:

(a) a first air intake for drawing in a volume of fresh air;

(b) a first heat exchanging coil for cooling and dehumidifying the volume of fresh air, thereby producing a supply of conditioned fresh air;

(c) a first fan for blowing the supply of conditioned fresh air through a first duct to a mixing box, said mixing box having a first damper for regulating air flow into a mixing chamber located with in said mixing box;

(d) a second air intake for drawing in a volume of recycled air from inside the building or other structure;

(e) a second heat exchanging coil for cooling and dehumidifying the volume of recycled air, thereby producing a supply of conditioned recycled air;

(f) a second fan for blowing the supply of conditioned recycled air through a second duct to said mixing box, said mixing box having a second damper for regulating air flow into said mixing chamber where conditioned fresh air is mixed with conditioned recycled air and then ventilated into a room or zone of the building or structure;

(g) a carbon dioxide sensor for providing a first feedback signal to a control system for controlling the first fan and the first damper; and (h) a temperature sensor for providing a second feedback signal to said control system for controlling the second fan and the second damper.

15. A heating, ventilation and air conditioning (HVAC) system as defined in claim 14 further comprising a first filter located downstream of the first air intake and a second filter located downstream of the second air intake.

16. A heating, ventilation and air conditioning (HVAC) system as defined in claim 15 wherein the first heat exchanging coil and the second heat exchanging coil form a single, integral heat-exchanging coil with a single coolant flowing within said single, integral heat-exchanging coil whereby the volume of fresh air travels in the first duct and the volume of recycled air travels in the second duct without mixing until the mixing box.

* * * * *